United States Patent [19]

Hill

[11] 4,156,364

[45] May 29, 1979

[54] IONIC CONDUCTION ANGULAR RATE SENSOR

[75] Inventor: Maynard L. Hill, Silver Spring, Md.

[73] Assignee: The Johns Hopkins University, Baltimore, Md.

[21] Appl. No.: 819,882

[22] Filed: Jul. 28, 1977

[51] Int. Cl.² .............................................. G01F 1/70
[52] U.S. Cl. .................................. 73/194 F; 73/384; 73/516 LM
[58] Field of Search .............. 73/194 F, 181, 516 R, 73/516 LM, 517 R, 517 A, 384

[56] References Cited

U.S. PATENT DOCUMENTS

| 1,808,709 | 6/1931 | Blake | 73/194 F |
| 2,611,268 | 9/1952 | Mellen | 73/194 F |
| 3,363,463 | 1/1968 | Wheeler | 73/384 X |
| 3,500,691 | 3/1970 | Moore | 73/516 LM |
| 3,910,122 | 10/1975 | Evans et al. | 73/516 LM |
| 4,041,376 | 8/1977 | Furuto et al. | 73/194 F X |

FOREIGN PATENT DOCUMENTS 2410365  11/1975  Fed. Rep. of Germany ......... 73/194 F

*Primary Examiner*—James J. Gill
*Attorney, Agent, or Firm*—Robert E. Archibald; Marc A. Block

[57] ABSTRACT

The present invention relates to a sensing device having a chamber containing positive and negative ions, wherein a fluid flow is directed into the chamber and ionized. The ionized flow passes between a plurality of conductive plates, the outputs from which can be used to indicate physical effects, such as air or gas flow and angular motion.

10 Claims, 9 Drawing Figures

IONIC CONDUCTION ANGULAR RATE SENSOR

STATEMENT OF GOVERNMENT INTEREST

The invention herein described was made in the course of or under a contract or subcontract thereunder, with the Department of the Navy.

BACKGROUND OF THE INVENTION

The prior art is replete with apparatuses for measuring rate of air flow, sensing rate, acceleration, and the like by using thermistors (U.S. Pat. No. 3,500,691; U.S. Pat. No. 3,628,371 and U.S. Pat. No. 3,631,729); by electrically accelerating ions of one polarity toward an ion collector or counter (U.S. Pat. No. 3,910,122 and U.S. Pat. No. 3,910,123); or by passing an electrically conductive fluid into a divider which splits the fluid and enters a portion of fluid into one electrolytic chamber with the other portion entering a second electrolytic chamber, the comparative portions depending on the acceleration transverse to the flow of fluid (U.S. Pat. No. 3,163,048). All of these techniques have, however, been encumbered by disadvantages that have rendered them less than optimal.

Assembly of sensors employing thermistors has proven to be difficult because accurate placement of very small thermistor beads is required. Also, the thermistor elements have been shown to be susceptible to damage by shock and vibration—a significant drawback in aircraft applications. In addition, long-term changes in calibration have been noted as the characteristics of the heated beads change. Further, ambient temperature and pressure changes as well as transient shifts resulting from heat transfer problems during turn on have also affected the performance of such devices.

The use of platinum wires instead of thermistors, which has also been proposed in the prior art, has required amplifiers and thermal compensation elements for the amplifiers, thereby adding to the complexity of the thermal device.

Those prior art techniques which teach the electrical acceleration of single polarity ions towards an ion collector or one of a plurality of ion collectors require sensitive circuitry for extracting ions of one polarity from a pool of ions of either polarity and delicate electrode elements for accelerating the ions like a "gun". Such apparatuses thus include a source of ions, means for separating out the ions of one polarity, means, generally cathodes and electrodes, for electrically accelerating that one polarity of ions, and means for collecting or counting the ions. The present invention obviates the need for the second and third means required by the prior art and provides for less complicated apparatus for the last means.

Measuring the volume of flow into two chambers, wherein an electric current induced through the fluid in each chamber measures Coriolis acceleration transverse to the flow, suffers from several shortcomings. First, impurities in the fluid will have severe effects on conductivity and, second, the variety of fluids which can be used are limited.

SUMMARY OF THE INVENTION

The present ionic conduction sensor apparatus improves over the apparatuses and techniques of the prior art by featuring a change-in-flow sensing device which is essentially unaffected by thermal effects and impurites in the fluid and is rugged, compact, inexpensive, and drift-free.

In addition, the present apparatus is versatile. Among other applications, one embodiment of the present invention can be used as an air flow sensor which can measure or determine (1) rate of climb or descent, i.e. vertical velocity, of an aircraft, or balloon (2) atmospheric gravity waves, (3) flow rates in fluidic amplifiers, (4) sonic boom intensity as well as the magnitude of subsonic pressure waves, and (5) flow in heating and air-conditioning ducts. Alternatively, another embodiment of the invention is an angular rate sensor which can substitute for or complement angular rate gyroscopes in autopilots for airborne vehicles. In particular, the present angular rate sensor could serve well as a wing leveller input to an autopilot for remotely piloted vehicles. The sensor is also versatile enough to be used generally where the rotational velocity of a body or the change in orientation of a fluid flow with respect to a stationary body is sought.

Further, it is an object of the invention to overcome disadvantages of motion sensors of the past by ionizing a fluid flow and measuring the effect on an otherwise constant electric field caused by charge separation resulting from the entry of the ionized fluid flow into the field.

DESCRIPTION OF THE INVENTION

In general the present invention relates to the measuring of variations in a fluid flow with respect to a sensing apparatus by directing the fluid flow into the sensing apparatus wherein it is ionized and then entered into an electric field. Changes in the rate of fluid flow or changes in direction can be sensed as variations in the electric field. Two embodiments of the general concept are set forth . Reference is also made to a co-pending application filed by Maynard L. Hill and Theodore R. Whyte Ser. No. 818,765 on July 26, 1977 relating to an "Ionic Air Speed Sensor" which employs techniques relating to the concept of the invention.

IONIC CONDUCTION AIR FLOW SENSOR

Figure 1:
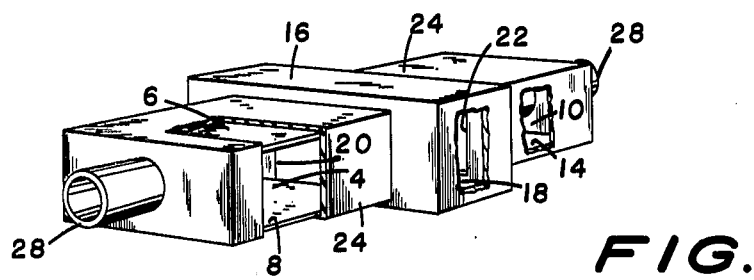
FIGS. 1 and 2 show an air flow sensor embodiment of the invention in perspective view and front view, respectively.
Figure 2:
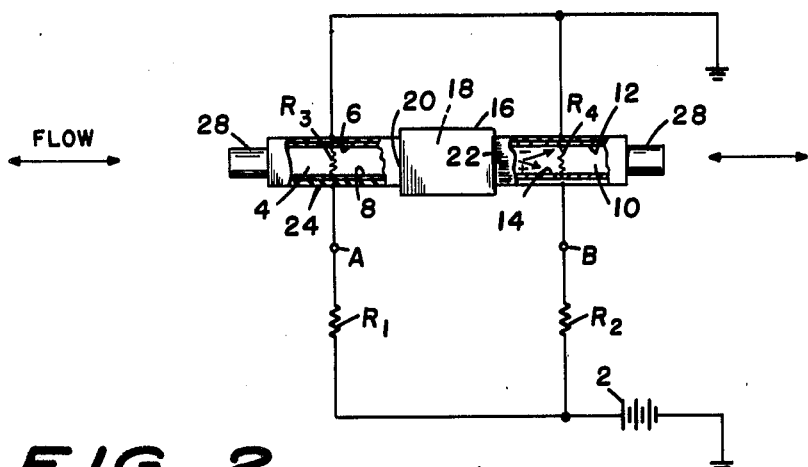

Referring to FIGS. 1 and 2, bridge network resistances are shown as $R_1$, $R_2$, $R_3$, and $R_4$, which carry d.c. current from a low-voltage battery 2. Variable "resistances" $R_3$ and $R_4$ represent the resistive effects existing in conductivity cell 4, between parallel, conductive plates 6 and 8 and in conductivity cell 10 between parallel, conductive plates 12 and 14, respectively. Between the two conductivity cells 4 and 10 is a chamber 16, which can be of cylindrical, cubical, or other geometrical shape, having an ion generator 18 contained therein. The ion generator 18 can be as simple as a radioactive element composed of Polonium or Americium which emits alpha particles that split neutral molecules into ion pairs. Each end of the chamber 16 has an opening 20 and 22, which provides a passageway from the chamber 16 into the conductivity cells 4 and 10, respectively. Enclosing and insulating the chamber 16 and conductivity cells 4 and 10 (including the conductivity plates 6, 8, 12, and 14), is a housing 24.

With no external influences, a constant electric field is produced in each conductivity cell 4 and 10 due to the connection of the battery 2 across the cells 4 and 10 via resistors $R_1$ and $R_2$, respectively. Although points A and B may be at different voltages under such conditions or, alternatively, may be maintained at the same voltage level, the difference in voltage between points A and B will remain constant. A sensing device 26, such as that shown in FIG. 3, can be made to produce a zero output in either case for the stable state.

However, when a fluid, such as air, enters one opening (20, for example) by means of a flow directing element 28 the fluid flow picks up positive and negative ions as shown in FIG. 2. The ionized fluid flow exits the chamber 16 through the other opening (22 in the example) carrying ions into the conductivity cell 10. The electric field across the plates 12 and 14 will change as will the resistive effects in the conductivity cell 10. The voltage at point B will accommodate the change in resistance $R_4$ and will be sensed in the sensing device 26 (of FIG. 3). The greater the ionic fluid flow, the more ions will enter the conductivity cell 10 and the more ions in the conductivity cell 10, the less resistance to charges moving through the conductivity cell 10. The lower the resistance $R_4$ the greater the current through $R_2$ to ground and the larger the voltage drop across $R_2$. The voltage at B will thus decrease as the fluid flow increases. In the bridge network of FIG. 3 the voltage at B will be less than the voltage at A which indicates that the fluid flow entered opening 20. The magnitude of the voltage differential measured by sensing device 26 represents the rate of flow of the fluid. On the other hand, a voltage at A less than the voltage at B would indicate fluid flow in the other direction.

Figure 3:
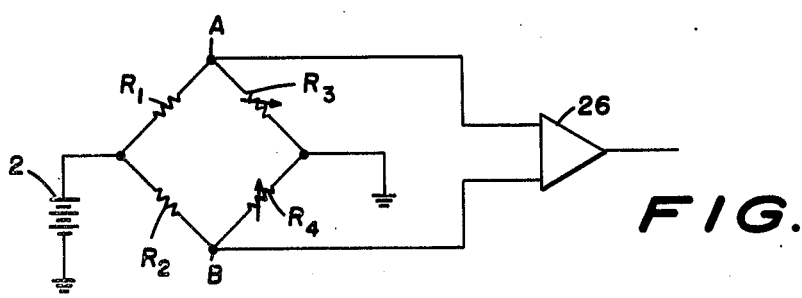
FIGS. 3, 7 and 9 illustrate circuit equivalents of the invention with associated sensing means.
Figure 4:
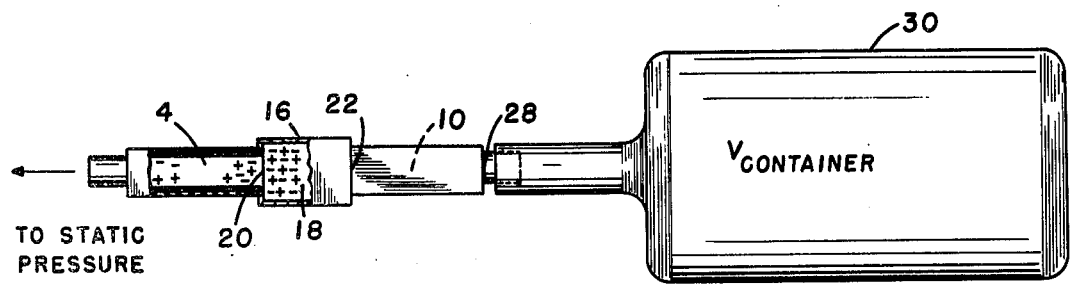
FIG. 4 shows the air flow sensor in a rate of climb/descent application.

One application of this embodiment is illustrated in FIG. 4. By affixing a fixed volume container 30 to one end of the fluid directing element 28 and a "static" pressure source (not shown), such as the atmosphere, to the other end of the flow directing element 28, a rate of climb/sink indicator is formed. During climb, the fluid, air, flows out of the container 30 into the flow directing means 28 through conductivity cell 10, into the chamber 16 where it is ionized, and then into conductivity cell 4 where the ion charges separate and flow toward the respective plate of opposite polarity, yielding a measurable output in a sensing device 26 (FIG. 3).

As previously mentioned, the current flowing through the bridge network branch being affected by the influx of positive and negative ions changes as the ionized fluid flow increases. Instead of the sensing device 26, a current or other resistance sensing device may also be used to measure the rate and direction of fluid flow. Also, instead of employing a bridge network and requiring two complementary electric fields, it is within the scope of the invention to provide one conductivity cell having a constant pumped input of ionized fluid which decreases or increases as the ram-air flow of fluid varies in magnitude and direction. By including a constant flow vacuum system or pump, the scale measuring air flow will be offset—i.e. instead of a zero reading indicating no fluid flow, it will represent a flow equal and opposite the pump flow input. The use of a pump can thus obviate the need for a second conductivity cell, the current in the one cell indicating the magnitude and direction of flow.

Changes in structure of the present embodiment to better optimize aerodynamic effects, such as tapering or rounding the surfaces through which the fluid flow passes, curving the flow directing element 28, or modifying the openings, are within the scope of the invention.

IONIC CONDUCTION ANGULAR RATE SENSOR

Figure 5:
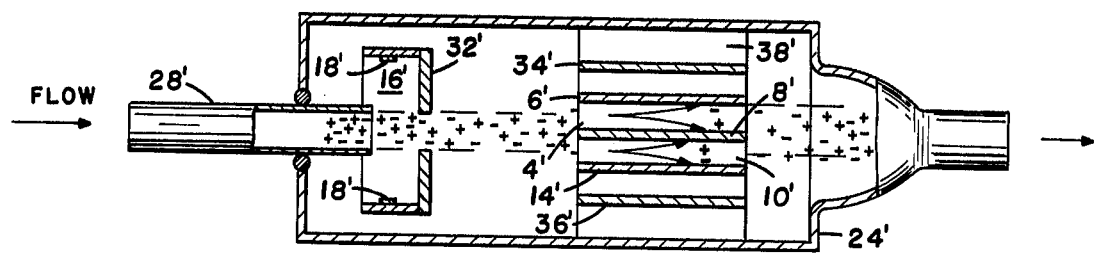
FIGS. 5, 6 and 8 show a front view of an angular rate sensor embodiment of the invention.

Referring to FIG. 5, flow directing element 28' is shown feeding fluid, such as air, into chamber 16'. Alpha particles generated in the chamber 16' by elements 18' of Polonium, Americium or such similar radioactive substance which react with the neutral particles in the fluid flow to generate ions of positive and negative polarities. A collimating element 32' is located at the exit of the chamber 16' causing the ionized fluid flow to take the form of a narrow jet. The ionized flow or jet then enters a plurality of conductivity cells 4' and 10', for example, located between conductive plates 6', 8' and 8',14', respectively. Guard elements 34' and 36' are provided to protect the conductivity cells 4' and 10' from external electrical effects. The conductive plates 6', 8', and 14' and guard elements 34' and 36' are insulated from each other by insulator elements 38' and, together with the chamber 16' are enclosed in an electrically insulated housing 24' having two ports provided for inletting and outputting the fluid flow.

Figure 6:
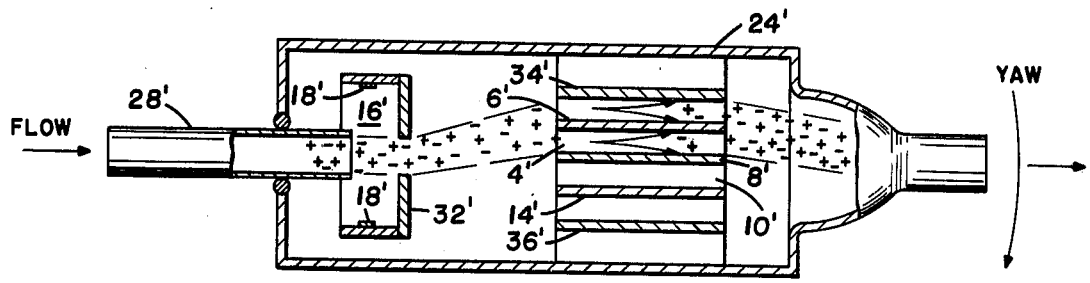

As seen in FIG. 6, the direction of fluid flow changes as the angular rate sensor apparatus moves angularly about the yaw axis. In accordance with the Coriolos effect, as the angular rate sensor apparatus rotates in a direction shown by the arrow, the fluid flow attempting to maintain a straightline path will appear to follow in a curved path with reference to he sensor apparatus. During yaw the entry of ionized fluid into one of the conductivity cells 4' or 10' will decrease—the amount of decrease depending on the angular rate of motion.

By measuring the comparative voltages at points A' and B' (see FIG. 7) in a bridge network defined by resistances $R_1'$, $R_2'$, $R_3'$, and $R_4'$, the proportion of ionized fluid flow entering each conductivity cell 4' and 10' can be determined and the rate of angular flow is thus readily measurable.

Figure 8:
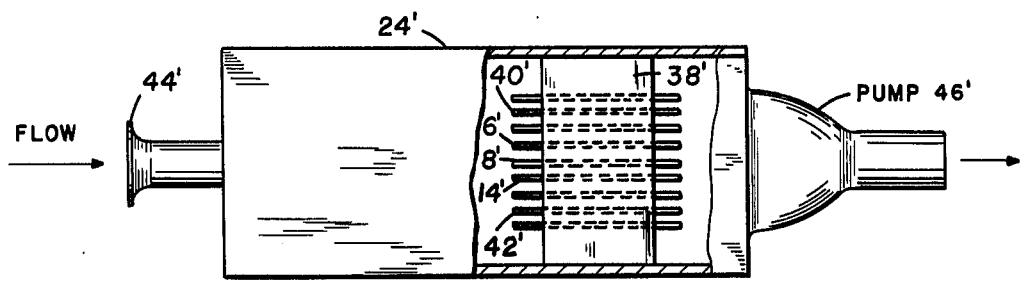
Figure 9:
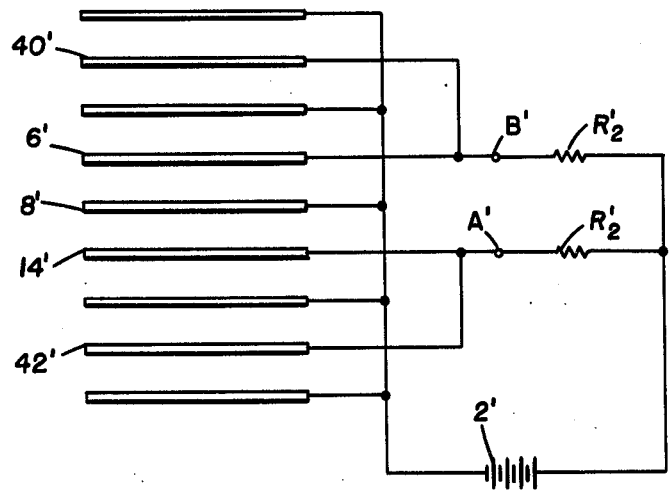

FIGS. 8 and 9 show the inclusion of additional conductivity plates 40' and 42' to enhance the sensitivity of the invention. FIG. 8 also shows a bell-shaped fluid flow inlet 44' and a tapered output 46'.

Also suggested in FIG. 8 is an optional fluid pump (not shown) which can draw air into the angular rate sensor. Alternatively the pump can be at the input to force air through. The difference in voltage at A' and B' in FIG. 9 can, as in FIG. 7, be measured to indicate angular rate.

It is to be understood that the invention can be practiced other than as described hereinabove, the scope of the invention being limited only by the appended claims.

What is claimed is:

1. Apparatus for sensing fluid flow changes comprising:
   a hollow cell having two ends and having an opening at each end,
   means, within the cell, for generating positive and negative ions in the cell, means, connected to the cell, for directing a fluid flow into one opening of the cell, thereby mixing the generated positive and negative ions into the fluid flow in the cell, means for producing an electric field into which the ionized flow is entered, and means, connected to the electric field producing means, for sensing variations in the electric field resulting from the entry of the ionized fluid flow into the electric field, wherein the field producing means comprises:
a direct current (d.c.) voltage source, and
three parallel conductivity plates, the first and second of which are biased to a first polarity of the direct current voltage source and the third of which is biased to the second polarity, the three conductivity plates being positioned such that the third conductivity plate is between the first conductivity plate and the second conductivity plate.

2. Apparatus for sensing fluid flow changes, as in claim 1, wherein the field producing means further comprises:
two conductive guard elements, biased to the second polarity of the direct current voltage source, one element being placed parallel to and at a distance from the first plate and the other element being placed parallel to and at a distance from the second plate, such that the first plate and the second plate are located between the two conductive guard elements.

3. Apparatus for sensing fluid flow changes, as in claim 2, wherein the variation sensing means comprises:
a resistor bridge network having four branches comprising two fixed resistances and the two effective resistances across the first and third conductivity plates and the second and third conductivity plates, respectively.

4. Apparatus for sensing fluid flow changes, as in claim 1, wherein all the conductivity plates are flat and the plane of the third plate is equidistant from the plane of the first plate and the plane of the second plate and wherein the third plate is along the centerline connecting the two openings of the cell.

5. Apparatus for sensing fluid flow changes, as in claim 4, wherein the third plate bisects the ionized fluid flow as it enters the field producing means when the sensing apparatus is experiencing no angular motion.

6. Apparatus for sensing fluid flow changes, as in claim 5, wherein the trajectory of the ionized fluid flow selectively curves toward the first plate or the second plate when the sensing apparatus experiences angular motion perpendicular to and in the direction of the second plate or first plate, respectively.

7. Apparatus for sensing fluid flow changes, comprising:
a hollow cell having two ends and having an opening at each end,
means, within the cell, for generating positive and negative ions in the cell,
means, connected to the cell, for directing a fluid flow into one opening of the cell, thereby mixing the generated positive and negative ions into the fluid flow in the cell,
means for producing an electric field into which the ionized flow is entered, and
means, connected to the electric field producing means, for sensing variations in the electric field resulting from the entry of the ionized fluid flow into the electric field,
wherein the field producing means comprises:
a direct current (d.c.) voltage source,
a first fixed resistance having a lead at each end,
a second fixed resistance having a lead at each end,
a first plurality of parallel, electrically connected conductivity plates each of which is connected to one lead of the first fixed resistance, the second lead of the first fixed resistance being connected to the first pole of the d.c. voltage source,
a second plurality of parallel, electrically connected conductivity plates each of which is connected to one lead of the second fixed resistance, the other lead of the second fixed resistance being connected to the second pole of the d.c. voltage source, and
a third plurality of parallel, electrically connected conductivity plates connected to the second pole of the d.c. voltage source, wherein each conductivity plate of the third plurality is placed between one conductivity plate from the first plurality and one conductivity plate from the second plurality.

8. Apparatus for sensing fluid flow changes, as in claim 7, further comprising:
two conductive guard elements, biased to the second polarity of the direct current voltage source, positioned such that the first plurality, the second plurality, and the third plurality of conductivity plates are sandwiched between the two conductive guard elements.

9. Apparatus for sensing fluid flow changes, as in claim 7, wherein the variation sensing means comprises:
a comparator for measuring the difference between the voltage on the first plurality of conductivity plates and the voltage on the second plurality of conductivity plates.

10. Apparatus for sensing fluid flow changes, comprising:
a hollow cell having two ends and having an opening at each end,
means, within the cell, for generating positive and negative ions in the cell,
means, connected to the cell, for directing a fluid flow into one opening of the cell thereby mixing the generated positive and negative ions into the fluid flow in the cell,
means, connected to the fluid flow directing means, for physically collimating the ionized fluid flow into a narrow jet,
means for producing an electric field into which the collimated ionized fluid flow is entered, and
means, connected to the electric field producing means, for sensing variations in the electric field resulting from the entry of the ionized fluid flow into the electric field.

* * * * *

UNITED STATES PATENT AND TRADEMARK OFFICE
CERTIFICATE OF CORRECTION

PATENT NO. : 4,156,364
DATED : May 29, 1979
INVENTOR(S) : Maynard L. Hill

Figure 7:
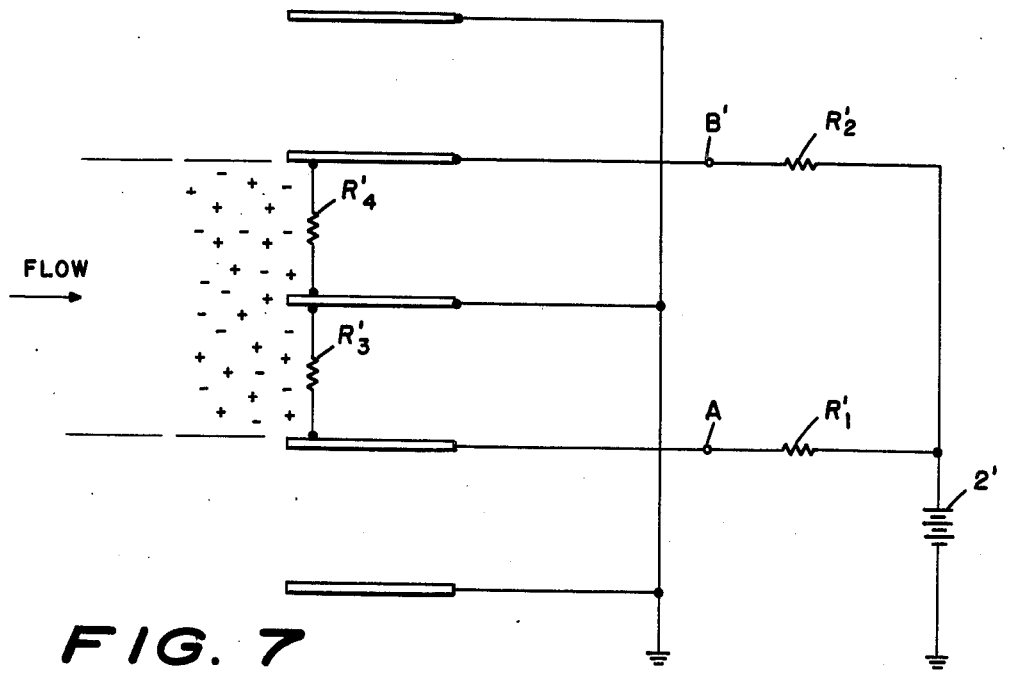

It is certified that error appears in the above-identified patent and that said Letters Patent are hereby corrected as shown below:

In Figure 7, change "A" to --A'--.

In Figure 9, to the right of A', change

"$R_2'$" to --$R_1'$--

Signed and Sealed this

*Twenty-third* Day of *October 1979*

[SEAL]

Attest:

RUTH C. MASON
*Attesting Officer*

LUTRELLE F. PARKER
*Acting Commissioner of Patents and Trademarks*